UNITED STATES PATENT OFFICE 2,236,251

CEMENT MIX

Edward W. Scripture, Jr., Cleveland Heights, Ohio, assignor to The Master Builders Company, Cleveland, Ohio, a corporation of Ohio No Drawing. Application November 6, 1934, Serial No. 751,747

10 Claims. (Cl. 106—24)

This invention relates to hydraulic cements, mortars and the like, and particularly to means to increase the fluidity of a cement or mortar mix, so that the fluidity of a mix containing a given amount of water will be substantially increased, or so that the amount of water required for a mix of a given degree of fluidity or plasticity will be substantially reduced.

It is well known that the properties of concrete are influenced by the amount of water employed in the mix. A certain quantity of water is required in order that the cement, sand, gravel or other ingredients of the mix can be properly mixed together, so that the material will flow readily, and can be worked satisfactorily, but it has been found that the water content of the mix should be kept as low as possible as the strength and density of the finished concrete is reduced by an increase in the water content.

It is an object of the present invention to provide means to increase the fluidity of a mix of concrete without increasing the amount of water employed in the mix.

A further object of the invention is to provide means to produce a concrete mix having a given degree of fluidity, while employing a substantially smaller quantity of water than has heretofore been required to secure this degree of fluidity.

Another object of the invention is to provide an improved concrete which can be worked easily and readily, and which shrinks less in hardening than the concrete now employed, and which, when hardened, is denser and less permeable than the concrete now in use.

A further object of the invention is to provide a plasticizing agent which can be added to a batch of concrete or the like as it is being mixed, or to one of the ingredients before the material is mixed, and which will increase the fluidity of the mix compared to that of a similar mix prepared without the plasticizing agent.

Other objects of the invention and features of the invention will be apparent from the following description.

I have found that the plasticity or fluidity of a mix of concrete is greatly increased by the presence of a small quantity of plant constituents known as "saponins." The saponins constitute a group of glucosides which are widely distributed in plants and which differ in chemical composition, but which have certain chemical and physical properties in common, the most characteristic of which are that they materially lower the surface tension of water when in solution, and that they form colloidal solutions in water which produce a soapy foam when agitated. A few of the saponins are saponin, senegin, polygaleic or quillaic acid.

The saponins or saponaceous substances which are readily soluble in water, or readily form colloidal dispersions in water are desirable for the use herein described. They should be relatively pure, however, as the presence, for example, of sugars is deleterious to the concrete or mortar.

Another group of agents which may be used for increasing the fluidity of cement is the group of extracts or compounds obtained from wood, such as pyroligneous acid, pyrogallic acid and waste sulphite liquor. Plasticizing agents in this group have the property of materially lowering the surface tension of water, but they may not foam. They are, however, soluble or dispersible in water and are not highly unsaturated.

A still further group of compounds which act as plasticizing agents for a cement mix are compounds which may be classed as long hydrocarbon chains terminated by a polar group. Examples of these compounds are lauryl sodium sulphate, lauryl diethylene glycol ammonia sulphate, hydrogenated alkyl anthracene sulphonic acids and butyl naphthalene sulphonic acids. These compounds are soluble or dispersible in water and lower the surface tension of water to a high degree, are not too highly unsaturated, and have the characteristic of producing a foam when agitated.

The plasticizing agent may be added to the mix in any desired manner, and I have found that an effective means is to prepare a solution of a saponin and add some of this to the mix. A relatively small quantity of saponin is required. It has been found that one pint of a 1% solution for each sack of cement is suitable for a mixture consisting of one part Portland cement and three parts standard sand. By weight the quantity of saponin employed may vary from .005% to .02% of the weight of the cement employed in the mix.

While it is to be understood that there may be considerable variation in the proportions desirable for different mixes and that the property of increasing fluidity is not restricted to the precise percentages herein stated, it has been found with respect to the hydrocarbon chain compounds, that these compounds added in the proportion of from .002% to 0.1% of the weight of cement, are highly effective to increase the fluidity of the cement mix. As to the pyroligneous acid and the pyrogallic acid, these acids added in the proportion of .001% to .04% of the weight of cement, are highly effective. When using waste sulphite liquor, it has been found that one-half pint to one and one-half pints per standard sack of cement is desirable for increasing the fluidity. It is to be understood that the percentages just mentioned are those which have been found desirable, but quantities either more or less may be very useful in increasing the fluidity of the cement mix.

The mix is prepared in the usual manner except for the addition of the plasticizing agent. The completed mix, because of the presence of the plasticizing agent, is much more fluid and flows more readily than a similar mix prepared with the same quantity of water but without the plasticizing agent. Because of the greater fluidity the mix is more readily workable, is of increased density, and is more cohesive, thereby preventing segregation of the aggregates of the mix.

Because of the increase in the fluidity of the mix, which is produced by the plasticizing agent provided by my invention, it is possible to reduce the amount of water employed in a mix and still produce a mix having a satisfactory degree of fluidity so as to be workable, and this reduction in the amount of water produces a concrete of increased strength and density. This also makes possible the use of leaner mixtures, that is, mixtures having relatively smaller amounts of cement than usually employed. This results in a substantial saving and produces a concrete which shrinks less than those produced by the mixes now employed, while the concrete is as strong or stronger than those prepared without the plasticizing agent provided by my invention.

An advantageous plasticizing and indurating composition for addition to batches of mortar, hydraulic cement and the like in the process of mixing may be made by incorporating the plasticizing agent in a gelatinous inorganic colloid of ferric hydroxide, ferrous hydroxide, aluminosilicic acid, silicic acid or the like. The gelatinous inorganic colloid adds to the plasticity of the mix and tends to make the concrete or mortar more cohesive, preventing segregation or honeycombing.

The plasticizing and indurating mixture to be mixed with the cement or mortar may contain a finely divided, inorganic, inert solid, such as diatomaceous earth, talc, pumicite, or the like, in order to supply a fine material to the mix, which serves to fill voids in the finished product. Such fine materials tend to stiffen the mix so that more water is required to obtain the same flowability as in mixes lacking the fine material. By utilizing the plasticizing agent in a mix with the fine materials, a lower water-cement ratio may be maintained.

In some instances it is advantageous to mix the plasticizing agent with a pozzuolanic material, such as volcanic ash, trass, reactive silica, either in dry form or as a gelatinous colloid. Pozzuolanic materials have the property of combining with free lime in the cement or, separated by the cement, forming additional cementitious compounds and retarding corrosion of the concrete. Gelatinous pozzuolanic materials when added to a concrete mix ordinarily necessitate a substantial increase in the water-cement ratio and tend to weaken the concrete and increase shrinkage. However, when added together with the plasticizing agent above described, the water-cement ratio may be kept low and the advantages of the pozzuolanic material may be obtained without the disadvantages consequent upon an increase in the water-cement ratio.

A concrete or mortar mix in which metallic particles replace a portion or all of the sand is commonly applied to the surface of mortar or concrete before it has set in order to make the concrete or mortar more wear-resistant and more impermeable. It has been difficult to introduce such a metallic aggregate as a dry shake and to work it into the surface properly without the use of excess water, which promotes crazing, checking and shrinkage.

By mixing the plasticizing agent of the present invention with the metallic aggregate, much less water is required, the application to the mortar or concrete is facilitated, and the difficulties heretofore experienced are eliminated. With a suitable electrolyte, such as calcium chloride, to promote oxidation in the case of iron or steel aggregate, the mixture of plasticizing and metallic aggregate may be used integrally in the cement mix, because the increase in volume of the metallic particles on partial or complete conversion to oxide fills the voids, neutralizes the tendency of the mortar to contract during hardening and may even be made to cause a slight expansion.

Such waterproofing materials as stearates or stearic acid may be added to the mix in the form of a paste sufficiently mobile to mix homogeneously with the mortar or concrete. The plasticizing agent, saponin or the like alone, or with an inorganic colloid in combination, may be advantageously mixed with the stearate or stearic acid, making it possible to have a greater percentage of stearate in a mixture having sufficient fluidity to mix easily with the mortar or concrete.

A comparison, by way of example, of the increased fluidity of two mixes A and B of Portland cement is given below:

Each mix contained 50 lbs. of cement; 112½ lbs. of sand and 187½ lbs. of crushed limestone. To mix A 3⅜ gals. of water were added, and in mix B were added 3⅜ gals. of water, in which was included 1 pt. of 1% saponin solution. These mixes were given the standard slump test for testing Portland cement mixtures, and it was found that in mix A the slump was 1½" and in mix B the slump was 2¾", which was nearly a 100% increase in the slump, thus showing a greatly increased fluidity by use of the plasticizing agent.

In order to compare the compressive strength of Portland cement made with and without the saponin solution, the following mixes were made up to the same consistency and from these mixes cylinders were made and broken according to standard methods. Mix C contained 1 lb. of Portland cement and 3 lbs. standard sand, and mix D included 1 lb. of Portland cement and 3 lbs. of standard sand, and 1% saponin solution added in the proportion of 1 pt. of such solution per sack of cement. The compressive strength in pounds per square inch is shown in the table below:

|  | 3 days | 7 days | 28 days |
|---|---|---|---|
| Mix C | 1402 | 2386 | 4234 |
| Mix D | 1846 | 3215 | 5092 |

The action of the plasticizing and indurating compositions herein described is not affected by the presence of an accelerator, which is sometimes used.

The plasticizing agent may be added to the concrete or mortar at the time of mixing, or it may be combined with the aggregate or cement which is to be used in the mix, or it may be added to the water with which the mix is tempered.

From the foregoing it will be seen that I have provided a plasticizing agent which can be readily added to concrete mixes and which substantially increases the fluidity or flowability of the mix over that of a similar mix prepared without this agent. It will be seen also that because of the increased flowability produced by the plasticizing agent provided by my invention, the quantity of water employed in the mix can be substantially reduced, thereby providing a superior concrete, while additional aggregates may be added to the mix without it becoming necessary to increase the water content of the mix to an unsatisfactory degree, as has heretofore been required.

Furthermore, it is to be understood that the particular compounds disclosed, and the procedure set forth, are presented for purposes of explanation and illustration, and that various equivalents can be used and modifications of said procedure can be made without departing from my invention as defined in the appended claims.

What I claim is:

1. A mortar or cement mix, comprising a mixture of cement and aggregate made plastic by an aqueous solution of an organic compound of the class having a long hydrocarbon chain terminated by a polar group and being of relatively low degree of unsaturation, and having the property of lowering the surface tension of water to a high degree, the ratio of the organic compound to the cement by weight being from .002% to .01%.

2. A mortar or cement mix, comprising a mixture of cement and aggregate made plastic by a mixture of an inorganic gelatinous colloid and an aqueous solution of an organic compound of the class having a long hydrocarbon chain terminated by a polar group and being of relatively low degree of unsaturation, and having the property of lowering the surface tension of water to a high degree, the ratio of the organic compound to the cement by weight being from .002% to .01%.

3. A composition of matter, comprising an hydraulic cement and an alkali salt of a fatty alcohol sulphate in an amount of from .002% to .01% of the weight of the cement.

4. A concrete or mortar mix, comprising a mixture of cement and aggregate, and an alkali salt of a fatty alcohol sulphate, in an amount of from .002% to .01% of the weight of the cement.

5. A composition of matter, comprising an hydraulic cement and lauryl sodium sulphate in the amount of from .002% to .01% of the weight of the cement.

6. A concrete or mortar mix, comprising a mixture of an hydraulic cement and aggregate and lauryl sodium sulphate in the amount of from .002% to .01% of the weight of the cement.

7. A composition of matter, comprising an hydraulic cement and lauryl diethylene glycol ammonium sulphate in the amount of from .002% to .01% of the weight of the cement.

8. A concrete or mortar mix, comprising a mixture of an hydraulic cement and aggregate and lauryl diethylene glycol ammonium sulphate in the amount of from .002% to .01% of the weight of the cement.

9. A composition of matter, comprising an hydraulic cement and pyroligneous acid in the amount of from .001% to .04% of the weight of the cement.

10. A concrete or mortar mix, comprising a mixture of an hydraulic cement and aggregate and pyroligneous acid in the amount of from .001% to .04% of the weight of the cement.

EDWARD W. SCRIPTURE, Jr.

CERTIFICATE OF CORRECTION.

Patent No. 2,236,251.　　　　　　　　　　　　　　　　March 25, 1941.

EDWARD W. SCRIPTURE, JR.

It is hereby certified that error appears in the printed specification of the above numbered patent requiring correction as follows: Page 1, second column, line 52, for "0.1%" read --.01%--; and that the said Letters Patent should be read with this correction therein that the same may conform to the record of the case in the Patent Office.

Signed and sealed this 29th day of April, A. D. 1941.

(Seal)

Henry Van Arsdale,
Acting Commissioner of Patents.